(12) United States Patent
Fudge et al.

(10) Patent No.: US 10,267,428 B2
(45) Date of Patent: Apr. 23, 2019

(54) MODULAR CHECK VALVE

(71) Applicant: Strataflo Products, Inc., Fort Wayne, IN (US)

(72) Inventors: Bradley A. Fudge, Fort Wayne, IN (US); Andrew J. Warner, Fort Wayne, IN (US)

(73) Assignee: Strataflo Products, Inc., Fort Wayne, IN (US)

( * ) Notice: Subject to any disclaimer, the term of this patent is extended or adjusted under 35 U.S.C. 154(b) by 0 days.

(21) Appl. No.: 14/530,583

(22) Filed: Oct. 31, 2014

(65) Prior Publication Data
US 2016/0123483 A1    May 5, 2016

(51) Int. Cl.
*F16K 15/02*      (2006.01)
*F16K 27/02*      (2006.01)
*F16K 15/06*      (2006.01)

(52) U.S. Cl.
CPC ........ *F16K 27/0209* (2013.01); *F16K 15/063* (2013.01)

(58) Field of Classification Search
CPC ...... F16K 15/06; F16K 17/04; F16K 27/0209; F16K 15/063; Y10T 137/7855; Y10T 137/7915
USPC .......................... 137/540, 542, 543.13, 515.3
See application file for complete search history.

(56) References Cited

U.S. PATENT DOCUMENTS

| | | | |
|---|---|---|---|
| 1,275,697 A * | 8/1918 | Joyce | F16K 1/02 137/329.01 |
| 1,470,018 A * | 10/1923 | Love | F16K 15/063 137/533.25 |
| 1,709,740 A | 4/1929 | Rogers | |
| 1,779,421 A | 10/1930 | Cox | |
| 2,490,511 A * | 12/1949 | Courtot | F16K 15/063 137/514.3 |
| 2,900,999 A * | 8/1959 | Courtot | F16K 15/063 137/516.25 |
| 3,097,666 A * | 7/1963 | Antrim | F16K 15/063 137/515.5 |
| 3,794,077 A | 2/1974 | Fanshier | |
| 4,129,144 A | 12/1978 | Andersson | |
| 4,368,756 A | 1/1983 | Carlson | |
| 4,535,808 A | 8/1985 | Johanson et al. | |
| 4,979,721 A | 12/1990 | Gilbert | |
| 5,092,361 A | 3/1992 | Masuyama et al. | |
| 5,758,682 A | 6/1998 | Cain | |
| 6,866,062 B2 | 3/2005 | Lammers | |
| 7,036,523 B2 | 5/2006 | Nixon et al. | |

(Continued)

OTHER PUBLICATIONS http://www.checkall.com/valvestyles/un3/un3.htm, published Dec. 31, 2009, showing an image of a prior art valve.

(Continued)

*Primary Examiner* — P. Macade Nichols

(57) ABSTRACT

The invention relates to a check valve which in one embodiment is a modular three-piece valve assembly with easily serviceable and replaceable internal parts, and in another embodiment is a nodular two-piece valve with easily serviceable and replaceable internal parts. In each embodiment, the check valve includes a valve body of two or more pieces detachably attached to each other, and a poppet assembly for sealing the valve removably located within the overall body formed by the attachment of those detachably attached pieces.

14 Claims, 3 Drawing Sheets

(56) References Cited

U.S. PATENT DOCUMENTS

| | | |
|---|---|---|
| 7,066,201 B2 | 6/2006 | Chen et al. |
| 8,230,875 B2 | 7/2012 | Norman |
| 2009/0283157 A1 | 11/2009 | Hogan |
| 2009/0320939 A1 | 12/2009 | Loos |
| 2013/0092864 A1 | 4/2013 | Andersson |
| 2013/0228241 A1 | 9/2013 | Gass et al. |

OTHER PUBLICATIONS

Phyllis M. Nichols; U.S. Appl. No. 15/399,542; Office Action; dated Oct. 18, 2017.
Phyllis M. Nichols; U.S. Appl. No. 15/606,746; Office Action; dated Mar. 28, 2018.

* cited by examiner

MODULAR CHECK VALVE

BACKGROUND

This invention relates to controlling flow of fluids ma liquid or gas system and more particularly to a check valve for use in the unidirectional delivery of fluid liquid or fluid gas under pressure from a first location in a system to a second location in a system while substantially preventing fluid flow from the second location back to the first location.

Check valves are in widespread use for permitting fluids to flow through a passage in one direction while preventing flow in the reverse direction. Most check valves employ a movable poppet urged by a spring to engage a valve seat, thereby closing the valve. When force is exerted against the face of the poppet by fluid in the system moving in the direction permitted by the check valve, and that pressure exceeds the force of the spring, the poppet moves away from the seat, opening the valve.

Check valves are used in a variety of applications. For example, one common application of a check valve is at a fitting on a storage tank, where the check valve permits a flow of fluid from an external location for delivery to the storage tank, and then assists with retaining fluid in the storage tank when the source of fluid pressure (such as a compressor) shuts off by closing to prevent fluid flow in the reverse direction.

Check valves can be exposed to severe environmental conditions, including large pressure fluctuations, temperature fluctuations, and turbulent flow. In some applications, check valves are subjected to frequent forward and reverse flow cycles. Consequently, the poppet and other internal parts of check valves are in many applications subject to substantial vibrations which can result in noise, damage, or failure. Some valves of the prior art include a guide, sometimes called a retaining piece, mounted inside the valve for guiding and limiting movement of the poppet to prevent damage. In valves known to the art, retaining pieces are frequently located so that installation and replacement is difficult, or are flexible in construction or otherwise ill-suited for the severity of the environment. Further, the inaccessibility of the internal parts of check valves known to the art generally necessitates replacement of the entire valve assembly when only one part of the valve, such as the spring, fails.

Further, check valves known to the art are often purpose-built for connection to specifically-sized or specifically configured pipes or conduits. This limits the usefulness and versatility of check valves known to the art, as such valves can only be used in connection with the configuration of pipe or conduit for which they are built. Still further, check valves known to the art require a variety of fabrication techniques to make the different parts that comprise the valve assembly. Parts like the poppet or guide are often molded or cast, while parts like the housing are often machined. The variety of fabrication techniques requires to make the parts of a check valve increases the cost of the valve assembly.

It would a decided advantage to provide an improved check valve that allows convenient replacement one or more parts internal to the valve, including, specifically the poppet, spring, and retaining piece. It would further be to decided advantage to provide an improved check valve that can be easily adapted by a user for use with conduits or pipes of various sizes or various configurations without requiring the purchase of an entire new valve assembly. It would further be a decided advantage to provide a check valve wherein most parts can be produced by efficient fabrication techniques, such as machining.

SUMMARY

Among the several objects of the embodiments of this invention are to provide an improved check valve that allows convenient replacement one or more parts internal to the valve, including specifically the poppet and retaining, piece, to provide an improved check valve that can be easily adapted by a user for use with conduits or pipes of various sizes and various configurations, and to provide a check valve wherein most pans can be machined, reducing the number of fabrication techniques required for the production of the check valve assembly.

In general, a check valve of the present invention comprises an elongate body with a fluid passage extending therethrough from a first end constituting the end of the housing for entry of fluid under pressure to flow through to a second end constituting the end for exit of the housing for fluid under pressure. The first end also includes a seat. The check valve is formed of two or more pieces detachably attached to each other. The poppet assembly, which comprises a poppet with a head and a stem, a retainer with a sleeve and feet, and a biasing member between the poppet head and the retainer feet, fits within the elongate body so that the head of the poppet faces the seat. The poppet stem engages slidably with the retainer sleeve. The fluid passage includes a shelf that reduces the overall area of the fluid passage to an area smaller than the area defined by the retainer feet such that when the poppet assembly is aligned within the check valve, the retainer cannot travel past the shelf. The biasing member biases the inlet-facing portion of the poppet against the seat. When fluid under pressure flowing from the first end towards the second end encounters the poppet, the poppet slides away from the seat allowing fluid to enter the valve and pass through it. When pressure is removed, the biasing member presses the poppet head against the seat, substantially preventing the reverse flow of fluid.

In this way, embodiments of the present invention can be easily dis- and re-assembled for removal, replacement, or service of the internal parts. Further, most of the parts of check valves according to the teachings of the present invention can be manufactured by machining, reducing the need for multiple fabrication techniques. Additionally, one or more pieces of the check valves of the present invention can be replaced with pieces sized or otherwise configured to connect with pipes or conduits of different sizes or different configurations, allowing modularity and the ability to adapt the same valve, to several different functions or applications without requiring replacement of the entire valve assembly.

DETAILED DESCRIPTION

Figure 1:
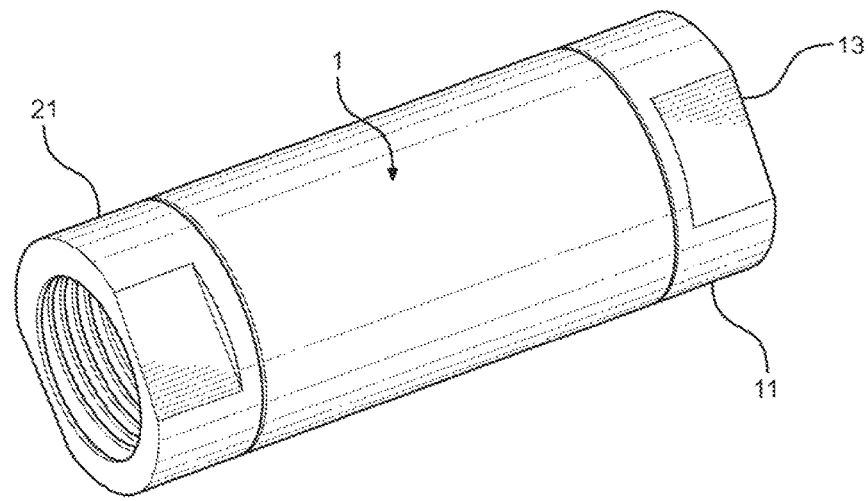
FIG. 1 shows a perspective view of one embodiment of the present invention.
Figure 2:
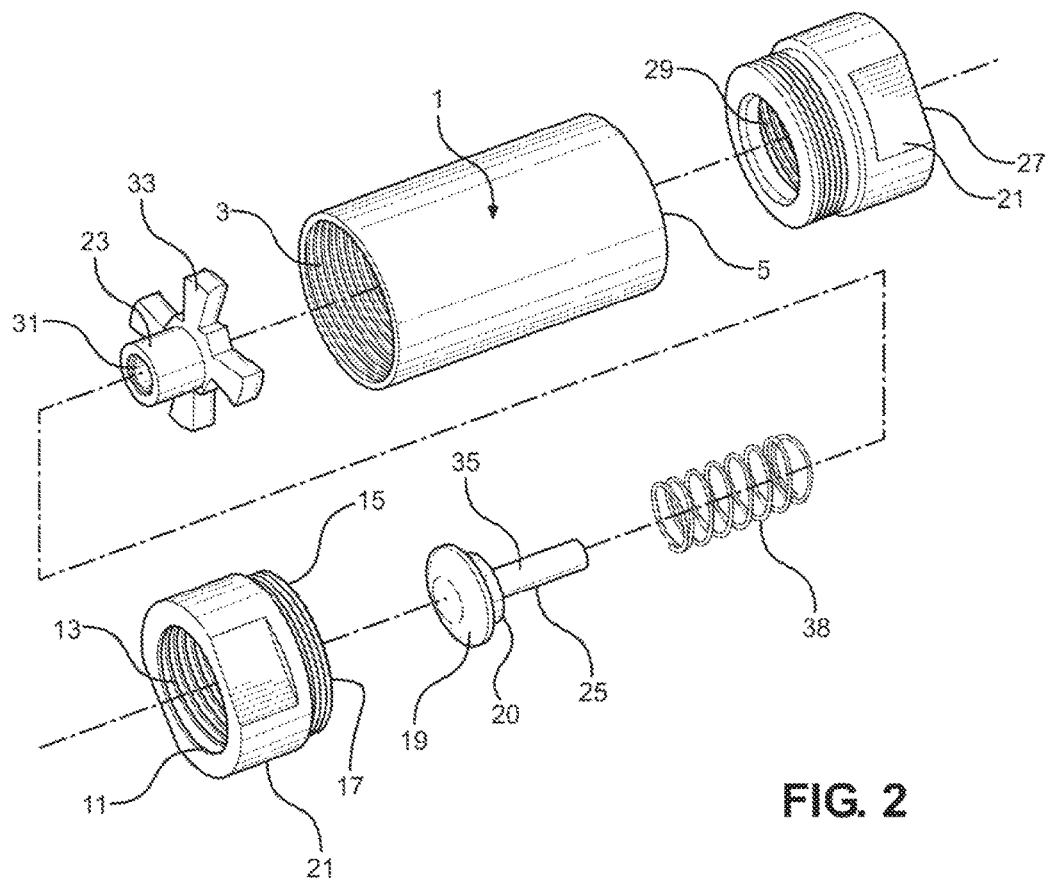
FIG. 2 shows an exploded view of one embodiment of the present invention.
Figure 3:
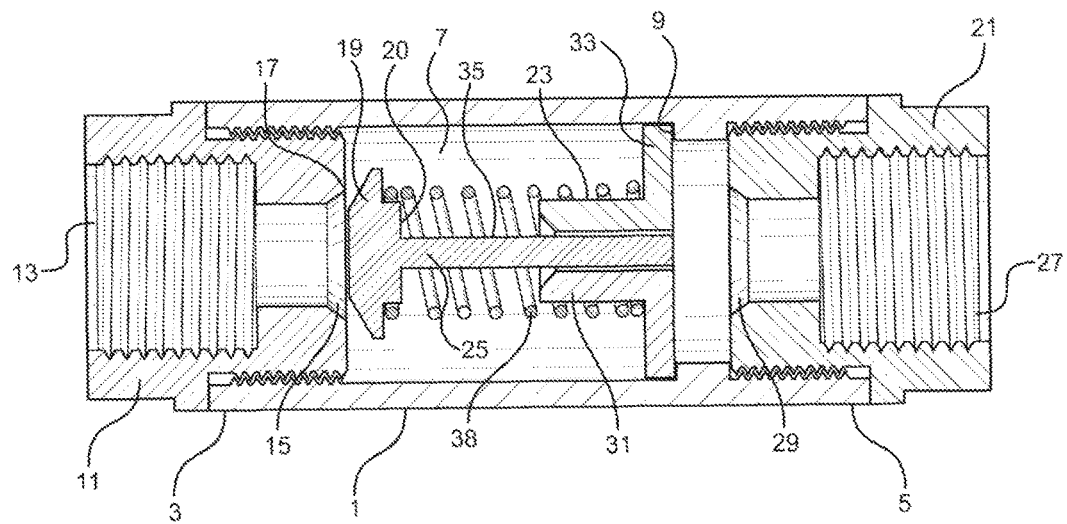
FIG. 3 shows a cross sectional view of the housing of one embodiment of the present invention.

In one embodiment, as shown in FIGS. 1-3, the improved check valve of the present invention comprises a three-piece assembly. In this embodiment, the check valve comprises a housing (1) with a first end (3) and a second end (5). The housing includes a fluid passage (7) that both connects said first end (3) to said second end (5) and passes through said first end (3) and said second end (5). The fluid passage (7) defines as void through the housing (1) through which fluid under pressure can pass. Although in preferred embodiments the fluid passage (7) is tubular, it will be appreciated by one skilled in the art that the fluid passage may assume a variety of internal cross-sectional configurations or shapes.

In the embodiment shown in FIGS. 1-3, a portion of the will of the fluid passage comprises a shelf (9). The shelf (9) comprises a ledge, a protrusion, or multiple protrusions, preferably coplanar, within the fluid passage (7). In the preferred tubular embodiment, the shelf (9) comprises a ridge running substantially around the perimeter of the wall of the fluid passage (7). The shelf (9) may comprise a unitary structure running around the entirety of the perimeter of the wall of the fluid passage, or may alternatively comprise one or more inwardly depending protrusions from the wall of the fluid passage that do not run around the entirety of the perimeter of the wall of the fluid passage. The plane defined by the shelf is substantially perpendicular to the axis of travel of fluid through the fluid passage (7). The shelf (9) may be located at a variety of locations within the housing (1). The shelf (9) may be located substantially at the midpoint of the housing (1), or between the midpoint of the housing (1) and the first end (3). In a preferred embodiment, the shelf (9) is located at a point between the midpoint of the housing (1) and the second end (5). Alternatively, the shelf (9) may be formed by one or more portions of the face of the inlet of the second end cap (21).

Embodiments of the invention further comprise a first end cap (11) detachably attached to the first end (3). The first end cap (11) comprises a first inlet (13), a first outlet (15), and a seat (17). In this embodiment, the first inlet (13) comprises the initial entry point of fluid into the check valve assembly. The seat (17) is disposed around the face of the first outlet (15) facing the second end (5). In the embodiment shown in FIGS. 1-3, the seat (17) comprises a bevel in the face of the first outlet (15) configured to mate sealably with the poppet head (19). The first outlet (15) comprises the general area in which fluid leaves the portion of the check valve assembly defined by the first end cap (11) and pushes the poppet (25) away from the seat (17). Fluid moves from the first inlet (13) to the first outlet (15), past the poppet head (29), and down the fluid passage (7) in the direction of the second end (5). The opening defined by the first outlet (15) has a cross-sectional area smaller than the cross-sectional area of the fluid passage (7) exclusive of the shelf (9). The opening defined by the first outlet (15) is preferably sized to prevent travel of the retainer (23) past the first outlet (15), such as in the event of catastrophic failure of the poppet (25).

These embodiments of the present invention further comprise, a second end cap (21) detachably attached to the second end (5). The second end cap (21) comprises a second inlet (29) and a second outlet (27). The second inlet (29) comprises general area in which fluid flowing from the direction of the first end (3) enters the second end cap (21). The second outlet (27) comprises the exit point of fluid from the check valve assembly. In one embodiment hereof, one or more portions of the face of the opening defined by the second inlet (29) comprises a shelf (9).

In the embodiment shown in FIGS. 1-3, the first end (3) and a portion of the first end cap (11) are cooperatively threaded for threaded engagement of the first end cap (11) to the first end (3). Similarly, the second end (5) of the housing (1) and a portion of the second end cap (21) are cooperatively threaded for threaded engagement of the second end cap (21) to the second end (5). In this way, the check valve assembly can be easily disassembled for service, removal, or replacement of internal parts. The first end (3) and first end cap (11), second end (5) and second end cap (21), or both, may be connected in manners other than by threaded engagement. Any form of connection suitable for plumbing or gas flow applications may be used, as will be appreciated by one skilled in the art. Suitable forms of connection include, by way of example, press-on connection, soldered connection, sweated connection, cemented connection, clamped connection, and friction fit connection. As will be appreciated by one skilled in the art, washers, rubber washers, gaskets, cements, epoxies, or sealants may be used to enhance the connection between the housing and the first end cap (11), second end cap (21), or both.

Further, in the embodiment shown in FIGS. 1-3, a portion of the first end cap (11) and a portion of the second end cap (21) are adapted for engagement with pipes or conduits of standard sizes. Although this adaptation is shown in FIGS. 1-3 as internal threading within the first inlet (13) and internal threading within the second outlet (27), one skilled in the art would appreciate that a variety of standard connection means and sizes could be used. For example, the first end cap (11) arid second end cap (21) could be selected or adapted for male or female threaded connection, or could be selected or adapted to connect by way of soldering, friction, cement, adhesive, or other known connection means, as would be appreciated by one skilled in the art, By replacing one or more of the first end cap (11) or second end cap (21), or both, with an end cap differently sized or differently configured for connection, the present invention allows a user to easily adapt the check valve for engagement with a wide variety of sizes and configurations of pipes or conduits, allowing the same check valve to be used or re-used in multiple applications or with multiples sizes of pipe or conduit.

A poppet assembly is located within the fluid passage (7). The poppet assembly comprises a retainer (23), a biasing member (38), and a poppet (25). The retainer (23) comprises a sleeve (31) adapted to retain the poppet (25). The retainer (23) is oriented within the fluid passage (7) so that the opening defined by the sleeve (31) is generally coaxial with the overall direction of travel of fluid. The retainer further comprises one or more feet (33) extending substantially perpendicularly from the sleeve (31). The feet are collectively sized to define an area smaller than the area if the fluid passage (7) exclusive of the shelf (9), but larger than the shelf (9), such that when the retainer (23) is placed Within the housing in the proper orientation the feet (33) cannot travel past the shelf (9). The "feet" may comprise a single unitary structure, such as a ring, or may comprise one or more outwardly-depending protrusions from the sleeve (31). In a preferred embodiment, the feet comprise at least three equally spaced outwardly-depending protrusions, and, in a most preferred embodiment, the feet comprise four equally-spaced outwardly depending protrusions. As will be appreciated by one skilled in the art, a large variety of numbers, shapes, sizes, and configurations of feet are possible within the scope and spirit of this invention.

A removable poppet (25), comprised of a head (19) and a stent (35), is slidably engaged with the retainer (23). The poppet (25) is positioned within the valve so that the stem (35) is within the sleeve (31) and the head (19) faces the seat (17). The poppet head (19) is shaped to cooperate with the seat (17) to font a releasable sealed engagement when the biasing member (38) presses the head (19) against the seat (17). A removable biasing member (38) is located between the poppet head (19) and the retainer feet (33) and is adapted to bias the poppet head (19) against the seat (17). In preferred embodiments, the biasing member (38) is retained between the poppet head (19) and retainer feet (33). In preferred embodiments, the poppet (25) comprises a collar (20) on a face of the head (19) opposite the face of the head (19) that seals to the seat, which assists the poppet (25) in aligning with the sleeve (31) when the poppet (25) is under pressure in the forward flow direction. Optionally, collar (20) may align with a cooperative bevel in the thee of the opening defined by the sleeve (31).

The biasing member (38) biases the poppet head (19) against the seat (17) such that when fluid subject to pressure of a desired minimum level moving in the appropriate direction encounters the poppet (25), the poppet head (19) slides away from the seat (17) towards the second end (5) allowing the fluid to pass into the housing (1). As long the fluid is subject to sufficient pressure in the appropriate direction, fluid will pass the poppet head (19) and pass through the check valve in the direction of travel from the first inlet (13) to the second outlet (29). If pressure in the appropriate direction becomes insufficient, or if pressure from the reverse direction is applied, the head (19) is biased back into substantially sealed engagement with the seat (17), substantially preventing the reverse flow of fluid through the valve.

Figure 4:
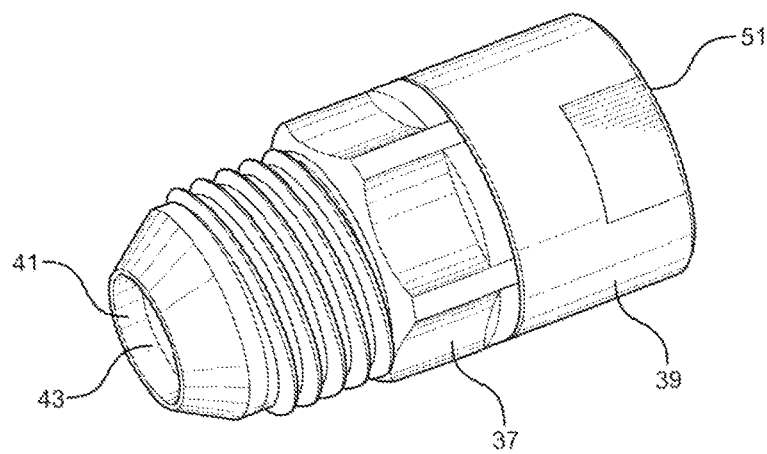
FIG. 4 shows a perspective view of a second embodiment of the present invention.
Figure 5:
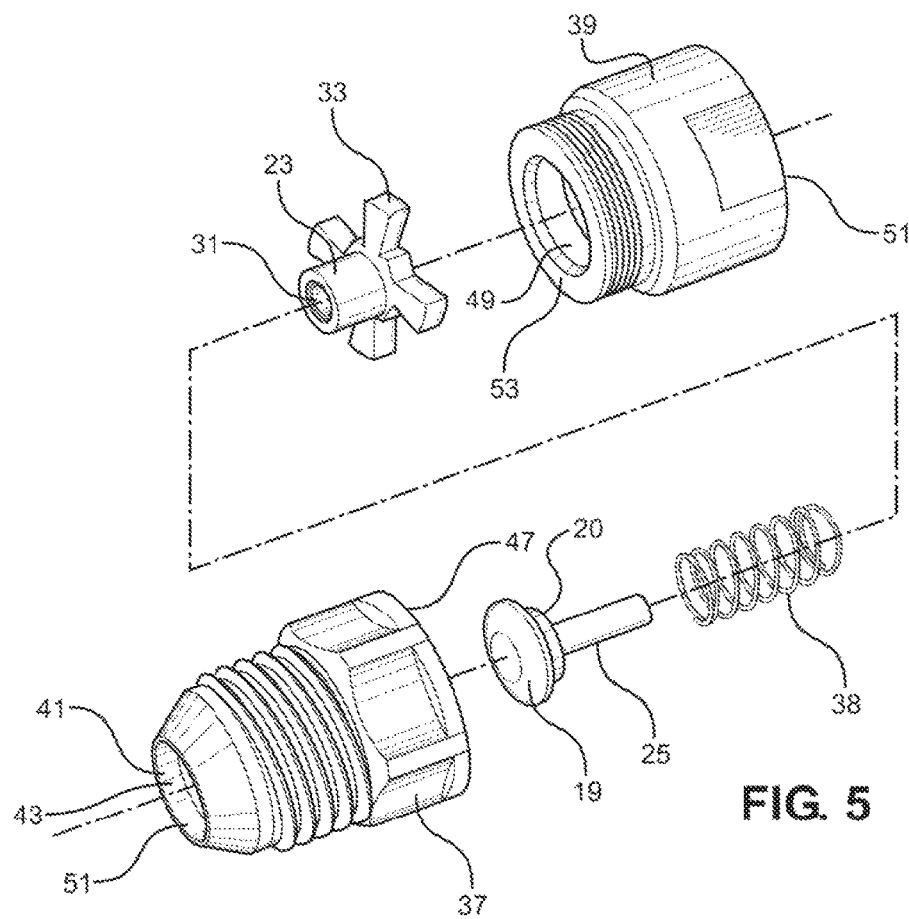
FIG. 5 shows an exploded view of a second embodiment of the present invention.
Figure 6:
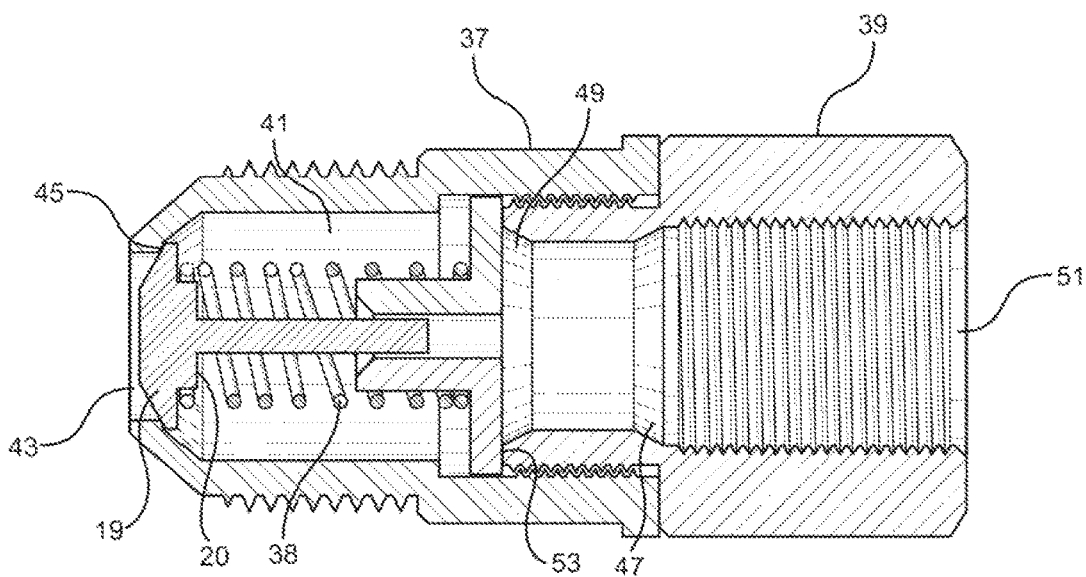
FIG. 6 shows a cross sectional view of the housing of a second embodiment of the present invention.

In a second embodiment, as shown in FIGS. 4-6, the improved check valve of the present invention comprises a two-piece assembly. In this embodiment, the check valve comprises an elongate body comprising a first piece (37) detachably attached to a second piece (39), with a fluid passage (41) running through the first piece (37) and second piece (39).

The first piece (37) comprises a first inlet (43), a first outlet (47) and a portion of the fluid passage (41). A seat (45) is disposed around the inner thee of the first inlet (43). In the embodiment shown in FIGS. 4-6, the seat (45) comprises a bevel in the inner face of the first inlet (43) configured to mate sealably with a poppet head (19). Preferably, the opening defined by the first inlet (43) has a cross-sectional area sized to prevent travel of a retainer (23) past the first inlet (43) in the event of failure of the poppet (25). Optionally, other portions of the first piece (37) may also have a cross-sectional area sized to prevent travel of the retainer (23) towards the first inlet (43).

The second piece (39) comprises a second inlet (49), a second outlet (51), and a ion of the fluid passage (41). The opening defined by the second inlet (49) has an area smaller than the opening defined by the first outlet (47) such that the portion of the second inlet (49) facing the first outlet (47) comprises a shelf (53) within the fluid passage (41) to prevent travel of the retainer (23) in the direction of the second outlet (51). As shown in FIGS. 4-6, a portion of the first piece (37) disposed toward the first outlet (47) comprises internal threading, and a portion of the second piece (39) disposed towards the second inlet (49) comprises cooperative external threading such that the first piece (37) and second piece (39) detachably connect by threaded engagement and such that a portion of the second inlet (49) defines a shelf (53) within the fluid passage (41) when the check valve is assembled. As will be appreciated by one skilled in the art, the threading may be reversed. In this way, the check valve assembly can be easily disassembled for service, removal, or replacement of internal parts. As will be appreciated by one skilled in the art, a variety of means of mechanical connection may be used to detachably attach the first piece (37) to the second piece (39) within the scope and spirit of this invention. Any form of connection suitable for plumbing or gas flow applications may be used, as will be appreciated by one skilled in the art. Suitable forms of connection include, by way of example, press-on connection, soldered connection, sweated connection, and friction fit connection. As will be appreciated by one skilled, in the art, washers, rubber washers, gaskets, cements, epoxies, or sealants may be used to enhance the connection between the first piece (37) and second piece (39).

Further, in the embodiment shown in FIGS. 4-6, a portion of the first piece (37) disposed towards the first inlet and a portion of the second piece (39) disposed towards the second outlet are adapted for engagement with pipes or conduits of various, and preferably standard, sizes. Although this adaptation is depicted in FIGS. 4-6 as threading on the exterior of a portion of the first piece (37) and within the outlet opening of a portion of the second piece (39), one skilled in the art would appreciate that a variety of configurations could be used to achieve connection between the ends of the check valve to various sizes and configurations of pipes or conduits. For example, the first piece (37), or second piece (39), or both could be selected or adapted for male or female connection to pipes or conduits, or could be selected or adapted to connect by way of threading, soldering, friction, cement, adhesive, or other known connection means as would be appreciated by one skilled in the art. By replacing one or more of the first piece (37) or second piece (39) with alternative pieces configured to fit to pipes or conduits of different sizes or configurations, or using different connection means, a user may easily adapt the check valve of this embodiment for engagement with a wide variety of sizes, types, or configurations of pipes or conduits, allowing the same check valve to be used or re-used in multiple applications.

A poppet assembly is located within the fluid passage (41). The poppet assembly comprises a retainer (23), a biasing member (38), and a poppet (25). The retainer (23) comprises a sleeve (31) adapted to retain the poppet (25). The retainer (23) is oriented within the fluid passage (41) so that the opening defined by the sleeve (31) is generally coaxial with the overall direction of travel of fluid. The retainer further comprises one or more feet (33) extending substantially perpendicularly from the sleeve (31). The feet are collectively sized to define an area larger than the shelf (53), such that when the retainer (23) is placed in the proper orientation the feet (33) cannot travel past the shelf (53). In a preferred embodiment there are at least three equally spaced feet, and in a most preferred embodiment, there are four equally spaced feet. As will be appreciated by one skilled in the art, a large variety of numbers, shapes, sizes, and configurations of feet are possible within the scope and spirit of this invention.

A removable poppet (25), comprised of as head (19) and a stem (35), is slidably engaged with the retainer (23). The poppet (25) is positioned so that the stem (35) is within the sleeve (31) and the head (19) faces the seat (45). The poppet head (19) is shaped to cooperate with the seat (45) to form a releasable sealed engagement when the biasing member (38) presses the head (19) against the seat (45). A removable biasing member (38) is located between the head (19) and the feet (33) and adapted to bias the head (19) against the seat (45). In preferred embodiments, the biasing member (38) is retained between the head (19) and feet (33). In preferred embodiments, the poppet (25) comprises as collar (20) on head (19) opposite the face of the head (19) that seals to the seat, which assists the poppet (25) in aligning with the sleeve (31) when the poppet (25) is under pressure in the forward flow direction. Optionally, the collar (20) may align with a cooperative bevel in the face of the opening defined by the sleeve (31).

The biasing member (38) biases the head (19) against the seat (45) such that when fluid under pressure of a desired minimum level moving in the appropriate direction encounters the poppet (25), the poppet (25) slides away from the seat (45) towards the second outlet (51) allowing the fluid to pass through the first inlet (43). As long as sufficient pressure is applied in the appropriate direction, fluid, will pass into the first inlet (41), past the retainer (23), and exit the valve assembly through the second outlet (51). If pressure in the appropriate direction ceases or pressure from the reverse direction is applied, the head (19) is biased back into substantially sealed engagement with the seat (45), substantially preventing the reverse flow of fluid through the valve.

Embodiments of the present invention can be manufactured or made from a variety of materials, as will be understood by one skilled in the art. Metals and metal alloys such as, for example, carbon steel, impact tested carbon steel, low temperature service carbon steel, stainless steel, malleable iron, non-ferrous metals, and chrome-molybdenum steel, non-metallic substances such as ABS, FRE, HDPFE, tempered glass, PVC, and other plastics, elastomers such as rubber, overmolded metals, and overmolded non-metallic materials, can all be used to for one or more parts of the check valve assembly taught herein, as will be appreciated by one skilled of the art In preferred embodiments, the body of the check valve, the poppet (25), and the retainer (23) are made of metal, preferably by machining.

Although the invention herein has been described with regard to specific embodiments, it will be understood that the invention is not limited to these embodiments. Alternative materials, manners of assembly or connection, retainer shapes or sizes, poppet shapes or sizes, or biasing means other than those expressly depicted herein may be used within the scope and spirit of this invention.

What is claimed is:

1. A check valve comprising:
   a housing comprising an elongate body with a first end, a second end, and a fluid passage connecting said first end and said second end, wherein said fluid passage comprises a passage wall and a void surrounded by said passage wall;
   an annular first shelf integral to said passage wall, said first shelf protruding into said void;
   a first end cap detachably attached to said first end, said first end cap comprising a first inlet and a first outlet, said first outlet comprising a seat;
   a second end cap detachably attached to said second end, said second end cap comprising a second inlet and a second outlet;
   a removable retainer slidably disposed and axially moveable within said fluid passage, said retainer comprising a sleeve and one or more feet, wherein said feet are substantially perpendicular to said sleeve, wherein said retainer fits within said fluid passage when said sleeve is oriented substantially coaxially with a longitudinal axis defined by said fluid passage, and wherein the area defined by said feet is larger than the area defined by an annular opening in said first shelf;
   a poppet comprising a head and a stem, said stem slidably engaged with said sleeve such that said poppet travels between a first position in which said head is substantially sealed against said seat and a second position in which said head is not substantially sealed against said seat; and
   a removable biasing member between said head and said feet biasing said head towards said first position;
   wherein said first end cap further comprises a second shelf within said fluid passage, such that when said sleeve is oriented substantially coaxially with a longitudinal axis defined by said fluid passage, said feet define an area wider than the area of a portion of said fluid passage surrounded by said first shelf and a portion of said fluid passage surrounded by said second shelf; and
   wherein said check valve permits fluid to travel from said first end through said fluid passage to said second end, but substantially prohibits fluid from traveling from said second end through said fluid passage to said first end.

2. The check valve of claim 1, wherein said first shelf is located at one or more of: the midpoint of said housing, a point between the midpoint of said housing and said second end, and a point between the midpoint of said housing and said first end.

3. The check valve of claim 1, wherein one or more of said first end and said first end cap and said second end and said second end cap are detachably attached by threaded engagement.

4. The check valve of claim 1, wherein one or more of said first end cap and said second end cap are configured to operatively connect to an external pipe.

5. The check valve of claim 4, wherein one or more of said first end cap and said second end cap are configured to operatively connect to an external pipe by threaded engagement.

6. The check valve of claim 1, wherein said biasing member comprises a spring.

7. The check valve of claim 1, wherein said poppet is one or more of metal, metal overmolded with elastomer, or plastic.

8. The check valve of claim 7, wherein said housing, first end cap, second end cap, retainer, and poppet are metal and are fabricated by machining.

9. A check valve comprising:
   a two-piece housing comprising an elongate body, said body comprising a first piece, a second piece detachably attached to said first piece, and a fluid passage through said first piece and said second piece;
   said first piece comprising a first inlet and a first outlet, said first inlet comprising on one face a seat, and a portion of said fluid passage connecting said first inlet to said first outlet,
   said second piece comprising a second inlet and a second outlet, wherein said first outlet is detachably attached to said second inlet such that a portion of said second inlet defines a first shelf within said fluid passage, and wherein a portion of said fluid passage connects said second inlet to said second outlet,
   a removable retainer slidably disposed and axially moveable within said fluid passage, said retainer comprising a sleeve and one or more feet, wherein said feet are substantially perpendicular to said sleeve, and wherein said feet define an area wider than the area of the portion of said fluid passage surrounded by said first shelf;
   a poppet comprising a substantially rigid head and a stem, said stem slidably engaged with said sleeve such that said poppet travels between a first position in which said head is substantially sealed against said seat and a second position in which said head is not substantially sealed against said seat;

a removable biasing member positioned between said head and said feet biasing said head towards said first position;

wherein said first piece further comprises a second shelf within said fluid passage, such that when said sleeve is oriented substantially coaxially with a longitudinal axis defined by said fluid passage, said feet define an area wider than the area of a portion of said fluid passage surrounded by said first shelf and a portion of said fluid passage surrounded by said second shelf; and wherein said check valve permits fluid to travel from said first inlet through said fluid passage to said second outlet, but substantially prohibits fluid from traveling from said second outlet through said fluid passage to said first inlet.

10. The check valve of claim 9, wherein said first piece and said second piece are detachably attached by threaded engagement.

11. The check valve of claim 9, wherein one or more of said first piece and said second piece are configured to operatively connect to an external pipe.

12. The check valve of claim 9, wherein one or more of said first piece and said second piece operatively connect to one or more external pipes by threaded engagement.

13. The check valve of claim 9, wherein said poppet is one or more of metal, metal overmolded with elastomer, or plastic.

14. The check valve of claim 13, wherein said first piece, second piece, retainer, and poppet are comprised of machined steel.

\* \* \* \* \*

UNITED STATES PATENT AND TRADEMARK OFFICE
CERTIFICATE OF CORRECTION

PATENT NO. : 10,267,428 B2
APPLICATION NO. : 14/530583
DATED : April 23, 2019
INVENTOR(S) : Fudge et al.

It is certified that error appears in the above-identified patent and that said Letters Patent is hereby corrected as shown below:

On the Title Page

Item (57), In the Abstract, Line 4, delete "nodular" and insert --modular--

In the Specification

Column 1, Line 5, delete "ma" and insert --in a--

Column 1, Line 6, after "system" insert --,--

Column 1, Line 60, delete "to" and insert --a--

Column 2, Line 6, after "retaining" delete ","

Column 2, Line 10, delete "pans" and insert --parts--

Column 2, Line 46, after "valve" delete ","

Column 3, Line 12, delete "will" and insert --wall--

Column 4, Line 48, after "area", second occurrence, insert --of--

Column 4, Line 50, delete "Within" and insert --within--

Column 4, Line 63, delete "stent" and insert --stem--

Column 4, Line 67, delete "font" and insert --form--

Column 5, Line 12, delete "thee" and insert --face--

Signed and Sealed this
Eighteenth Day of June, 2019

Andrei Iancu
*Director of the United States Patent and Trademark Office*

CERTIFICATE OF CORRECTION (continued)
U.S. Pat. No. 10,267,428 B2

Column 5, Line 38, delete "thee" and insert --face--

Column 5, Line 49, delete "ion" and insert --portion--

Column 6, Line 8, after "skilled" delete ","

Column 6, Line 66, delete "as" and insert --a--

Column 7, Line 12, after "fluid" delete ","